US012724460B2

(12) United States Patent
Kim et al.

(10) Patent No.: US 12,724,460 B2
(45) Date of Patent: Sep. 1, 2026

(54) DISPLAY DEVICE

(71) Applicant: LG Display Co., Ltd., Seoul (KR)

(72) Inventors: Gotae Kim, Paju-si (KR); JungHyun Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 62 days.

(21) Appl. No.: 18/802,669

(22) Filed: Aug. 13, 2024

(65) Prior Publication Data

US 2025/0076931 A1 Mar. 6, 2025

(30) Foreign Application Priority Data

Aug. 30, 2023 (KR) ........................ 10-2023-0114485

(51) Int. Cl.
*G06F 1/16* (2006.01)

(52) U.S. Cl.
CPC .................................. *G06F 1/1652* (2013.01)

(58) Field of Classification Search
CPC ........... G06F 1/1652; H05K 7/00; H05K 5/00
See application file for complete search history.

(56) References Cited

U.S. PATENT DOCUMENTS 11,592,865 B2 2/2023 Moon et al.
11,615,721 B2 * 3/2023 Park ...................... G06F 3/0412 313/511
12,045,089 B2 7/2024 Moon et al.
12,287,678 B2 * 4/2025 Lee ....................... G06F 1/1656
2017/0126865 A1 5/2017 Lee
2020/0274104 A1 8/2020 Park
2021/0116964 A1 * 4/2021 Moon ................... G06F 1/1618
2023/0006173 A1 1/2023 Kim et al.
2023/0221761 A1 7/2023 Moon et al.
2023/0229199 A1 * 7/2023 Lee ....................... G06F 1/1656 361/679.27
2025/0008811 A1 1/2025 Kim

FOREIGN PATENT DOCUMENTS

CN 106847084 A 6/2017
CN 115565448 A 1/2023
CN 119233520 A 12/2024
KR 10-2018-0095749 A 8/2018
KR 10-2020-0104973 A 9/2020
KR 10-2023-0028335 A 2/2023

* cited by examiner

*Primary Examiner* — Imani N Hayman
*Assistant Examiner* — Rashen E Morrison
(74) *Attorney, Agent, or Firm* — Fenwick & West LLP

(57) ABSTRACT

A display device includes a display panel comprising a plurality of non-bending areas, and a bending area between the plurality of non-bending areas; and a support member on a rear surface of the display panel, wherein a first end of the support member in the bending area and a second end of the support member in the non-bending area have different shapes.

15 Claims, 5 Drawing Sheets

DISPLAY DEVICE

CROSS-REFERENCE TO RELATED APPLICATION

This application claims the priority from Republic of Korea Patent Application No. 10-2023-0114485, filed on Aug. 30, 2023, which is hereby incorporated by reference in its entirety.

BACKGROUND

Field

The present disclosure relates to a display device, and more particularly, to a display device capable of improving rigidity against an external impact.

Description of Related Art

Recent display devices, which are capable of displaying various pieces of information and interacting with users who receive the corresponding information, are required to have various sizes, various shapes, and various functions.

Examples of display devices include a liquid crystal display (LCD) device, an electrophoretic display device (FPD), a light-emitting diode (LED) display device, and the like.

As the display devices are variously utilized, the display device is variously designed to reduce an area of a non-display area, in which no image is displayed, to provide an aesthetic appearance to users.

In order to solve the above-mentioned problem, studies are being performed to curve or bend various portions of the display device by using flexibility of a flexible substrate by applying a flexible material to the substrate of the display device.

Meanwhile, there is a problem in that an external impact applied to the display device damages the display device and cracks and separates a display panel of the display device.

The crack and separation of the display panel hinder an image operation of the display area and cause a problem in that abnormal images are displayed. Therefore, various studies have been conducted to suppress cracks and separation in a bending area in which the display panel of the display device is bent, but the study results are still insufficient. Accordingly, there is an acute need to develop a technology to suppress the cracks and separation in the bending area.

SUMMARY

An object to be achieved by the present disclosure is to provide a support member capable of protecting a display panel to minimize or at least reduce damage to a display device caused by an external impact.

Another object to be achieved by the present disclosure is to provide a protection member in a bending area to minimize or at least reduce damage to a display device caused by an external impact.

Technical problems of the present disclosure are not limited to the aforementioned technical problems, and other technical problems, which are not mentioned above, may be clearly understood by those skilled in the art from the following descriptions.

The display device according to one or more embodiments of the present disclosure comprises a display panel comprising a plurality of non-bending areas, and a bending area between the plurality of non-bending areas, and a support member on a rear surface of the display panel, wherein a first end of the support member in the bending area and a second end of the support member in the non-bending area have different shapes.

The display device according to one or more embodiments of the present disclosure includes the support member configured to protect the display panel, thereby minimizing or at least reducing damage to the display device caused by an external impact.

The display device according to one or more embodiment of the present disclosure includes the protection member in the bending area, thereby minimizing or at least reducing damage to the display device caused by an external impact.

The effects according to the present disclosure are not limited to the aforementioned effects, and other effects, which are not mentioned above, will be clearly understood by those skilled in the art from the claims.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

Figure 1:
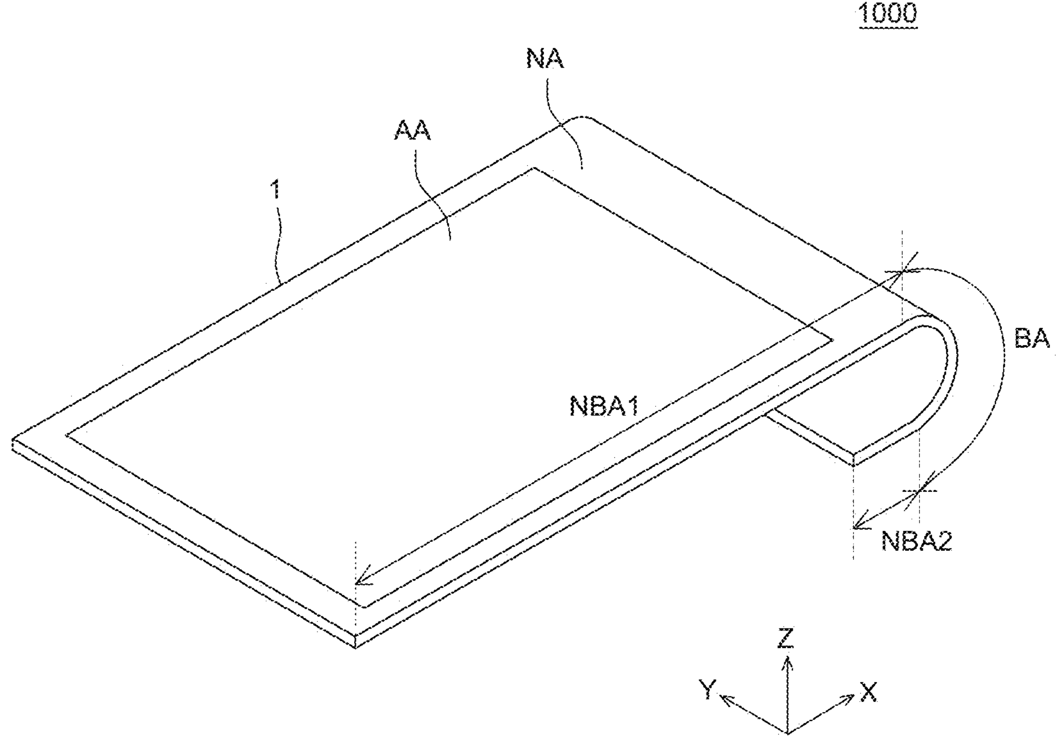
FIG. 1 is a view illustrating a display device according to one or more embodiments of the present disclosure.

The advantages and features of the present disclosure, and methods for accomplishing the same will be more clearly understood from embodiments described below with reference to the accompanying drawings. However, the present disclosure is not limited to the following embodiments but may be implemented in various different forms. The embodiments are provided only to complete the present disclosure and to fully provide a person with ordinary skill in the art to which the present disclosure pertains with the category of the disclosure, and the present disclosure will be defined by the appended claims.

The shapes, sizes, ratios, angles, numbers, and the like illustrated in the accompanying drawings for describing the embodiments of the present disclosure are merely examples, and the present disclosure is not limited thereto. Like reference numerals generally denote like elements throughout the disclosure. Further, in the following description of the present disclosure, a detailed explanation of known related technologies may be omitted to avoid unnecessarily obscuring the subject matter of the present disclosure. The terms such as “including,” “having,” and “comprising” used herein are generally intended to allow other components to be added unless the terms are used with the term “only”. Any references to singular may include plural unless expressly stated otherwise.

Components are interpreted to include an ordinary error range even if not expressly stated.

When the relation of a position of two parts is described using the terms such as “on”, “above”, “under”, and “next to”, there may be one or more other parts located between the two parts unless the terms are used with the term “immediately” or “directly”.

When the relation of a time sequential order is described using the terms such as “after”, “continuously to”, “next to”, and “before”, the order may not be continuous unless the terms are used with the term “immediately” or “directly”.

Although the terms “first”, “second”, and the like are used for describing various components, these components are not confined by these terms. These terms are merely used for distinguishing one component from the other components. Therefore, a first component to be mentioned below may be a second component in a technical concept of the present disclosure.

In describing components of the embodiment of the present disclosure, terminologies such as first, second, A, B, (a), (b), and the like may be used. These terminologies are used to distinguish a component from the other component, but a nature, an order, the number of the components, or the like is not limited by the terminology. When a component is “linked”, “coupled”, or “connected” to another component, the component may be directly linked or connected to the other component. However, unless specifically stated otherwise, it should be understood that a third component may be interposed between the components which may be indirectly linked or connected.

It should be understood that “at least one” includes all combinations of one or more of associated components. For example, “at least one of first, second, and third components” means that not only a first, second, or third component, but also all combinations of two or more of first, second, and third components are included.

In the present disclosure, a “device” (or apparatus) may include a display device (apparatus) which includes a display panel and a driver for driving the display panel, in a narrow sense, such as a liquid crystal module (LCM), and an organic light emitting module (OLED module). Further, the “device” (or apparatus) may further include a set electronic device (apparatus) or a set device (or a set apparatus) which is a complete product or a final product including an LCM, an OLED module, etc., such as a notebook computer, a television, or a computer monitor, an automotive device (apparatus) or equipment device (apparatus) including another type of vehicle and a mobile electronic device (apparatus) including a smart phone, an electronic pad, etc.

Accordingly, the display device of the present disclosure may include not only a display device itself in a narrow sense such as an LCM, an OLED module, etc., but also an applied product or a set device which is a final consumer device including the LCD, the OLED module, etc.

Further, in some embodiments, the LCM, the OLED module, etc. which is configured by a display panel, a driver, and the like may be represented as “a display device” in a narrow sense and an electronic device as a complete product including the LCM, and the OLED module may be represented as a “set device”. For example, the display device in the narrow sense includes a liquid crystal (LCD) display panel, an OLED display panel, and a source PCB which is a controller for driving the display panel. In contrast, the set device may be a concept further including a set PCB which is a set controller which is electrically connected to the source PCB to control the entire set device.

As a display panel used in one or more embodiments of the present disclosure, any type of display panel such as a liquid crystal display panel, an organic light emitting diode (OLED) display panel, and an electroluminescent display panel may be used. However, the display panel of the present disclosure is not limited thereto. For example, the display panel may be a specific display panel which is vibrated by a vibration device according to one or more embodiments of the present disclosure to output a sound. Further, a display panel used for the display device according to one or more embodiments of the present disclosure is not limited to a shape or a size of the display panel.

The features of various embodiments of the present disclosure can be partially or entirely coupled to or combined with each other and can be interlocked and operated in technically various ways, and the embodiments can be carried out independently of or in association with each other.

Hereinafter, the embodiment of the present disclosure will be described with reference to the accompanying drawings and embodiments as follows. Scales of components illustrated in the accompanying drawings are different from the real scales for the purpose of description, so that the scales are not limited to those illustrated in the drawings.

Hereinafter, embodiments of the present disclosure will be described in detail with reference to the drawings.

FIG. 1 is a view illustrating a display device according to one or more embodiments of the present disclosure.

FIG. 1 is a view illustrating a state in which a display panel 1 of a display device 1000 is bent according to one or more embodiments of the present disclosure.

The display panel 1 may include a bending area BA and non-bending areas NBA1 and NBA2. The non-bending areas NBA1 and NBA2 may include two or more areas in accordance with an area of a substrate. For example, the substrate may have the bending area BA between the two non-bending areas NBA1 and NBA2.

The bending area BA may be a partially curved (or bent) area of the display panel 1. Alternatively, the bending area BA is a partially curved (or bent) area of a substrate 110 included in the display panel 1. For example, the bending area may be a partially curved (or bent) area of the substrate 110 so that a pad part and an external module bonded to the pad part are disposed on a rear surface of the substrate. For example, as the bending area BA is bent in a direction toward the rear surface of the substrate, the external module bonded to the pad part of the substrate is moved toward the rear surface of the substrate, and the external module may not be visually recognized when viewed from above the substrate. In addition, as the bending area BA is bent, a size (or area) of a non-display area NA, which is visually recognized from above the substrate, such that a narrow bezel may be implemented.

The non-bending areas NBA1 and NBA2 may be areas in which the substrate 110 is partially flat without being curved (or bent). In the present disclosure, the non-bending areas NBA1 and NBA2 may include two areas. For example, the non-bending areas NBA1 and NBA2 may include a first non-bending area NBA1 in which a plurality of subpixels SP (see FIG. 2) are disposed and images are displayed, and a second non-bending area NBA2 in which a pad connected or bonded to a flexible film 2 (see FIG. 5) is disposed.

The first non-bending area NBA1 and the second non-bending area NBA2 may be bent (curved) by means of the bending area BA and face each other. The non-bending areas NBA1 and NBA2 may face each other.

The first non-bending area NBA1 of the substrate may include a display area (active area AA) and the non-display area (non-active area NA) configured to surround the display area AA. The non-display area NA of the substrate may be adjacent to the display area AA and disposed outside the display area AA.

The display area AA may be an area in which pixels P (see FIG. 2) are disposed and images are displayed. The display area AA may include a plurality of subpixels SP1, SP2, and SP3 (see FIG. 2). The plurality of subpixels SP1, SP2, and SP3 may each include a light-emitting element layer configured to display an image, and a thin-film transistor configured to operate the light-emitting element layer.

The non-display area NA may be an area in which no image is displayed. The non-display area NA may be an area in which various lines, a drive circuit, and the like are disposed to operate the plurality of subpixels SP disposed in the display area AA. Because the non-display area NA is not the area in which images are displayed, the non-display area NA, e.g., a bezel area may be reduced by bending a partial area of the non-display area NA of the substrate.

Figure 2:
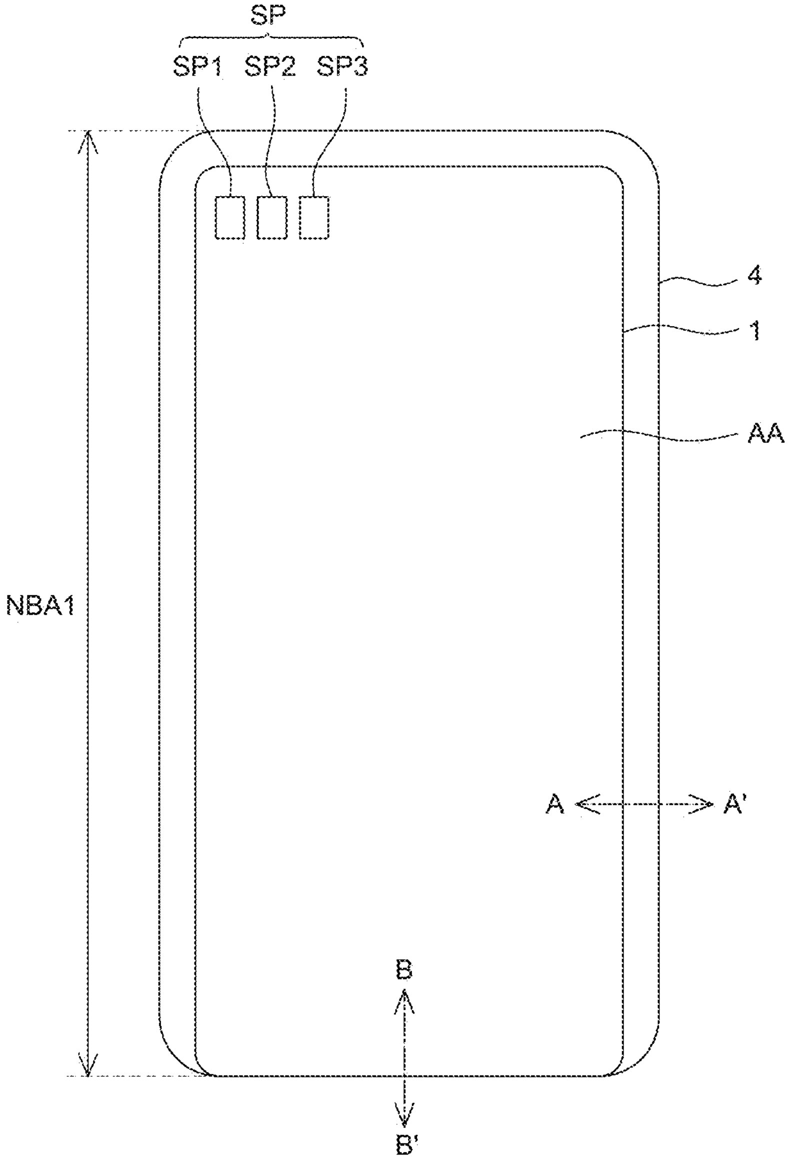
FIG. 2 is a top plan view of the display device according to one or more embodiments of the present disclosure.

FIG. 2 is a top plan view of the display device according to one or more embodiment of the present disclosure.

With reference to FIG. 2, the display device 1000 according to one or more embodiment of the present disclosure may include the display panel 1 and a support member 4.

The display panel 1 is a panel configured to display images. For example, display panels having all shapes, such as a liquid crystal display panel, an organic light-emitting diode (OLED) display panel, and an electroluminescent display panel, may be used as the display panel 1. However, the embodiments of the present disclosure are not limited thereto.

The display panel 1 may include the display area AA. The display area AA may be an area in which the pixels P are disposed and images are displayed. The display area AA may include the plurality of subpixels SP1, SP2, and SP3. The plurality of subpixels SP1, SP2, and SP3 may each include the light-emitting element layer configured to display an image, and the thin-film transistor configured to operate the light-emitting element layer.

The plurality of subpixels SP1, SP2, and SP3 may be individual units configured to emit light, and the plurality of subpixels SP1, SP2, and SP3 may emit light with red, green, blue, and/or white colors. However, the embodiments of the present disclosure are not limited thereto.

The support member 4 may be disposed to surround at least a part of the display panel 1. The support member 4 may be disposed to surround a part of an end of the first non-bending area NBA1, except for the bending area BA of the display panel 1. For example, the support member 4 may be disposed on the rear surface of the display panel 1 and surround and protect a rear surface and a side surface of the display panel 1 to inhibit the display panel 1 from being damaged by an external impact.

Figure 3:
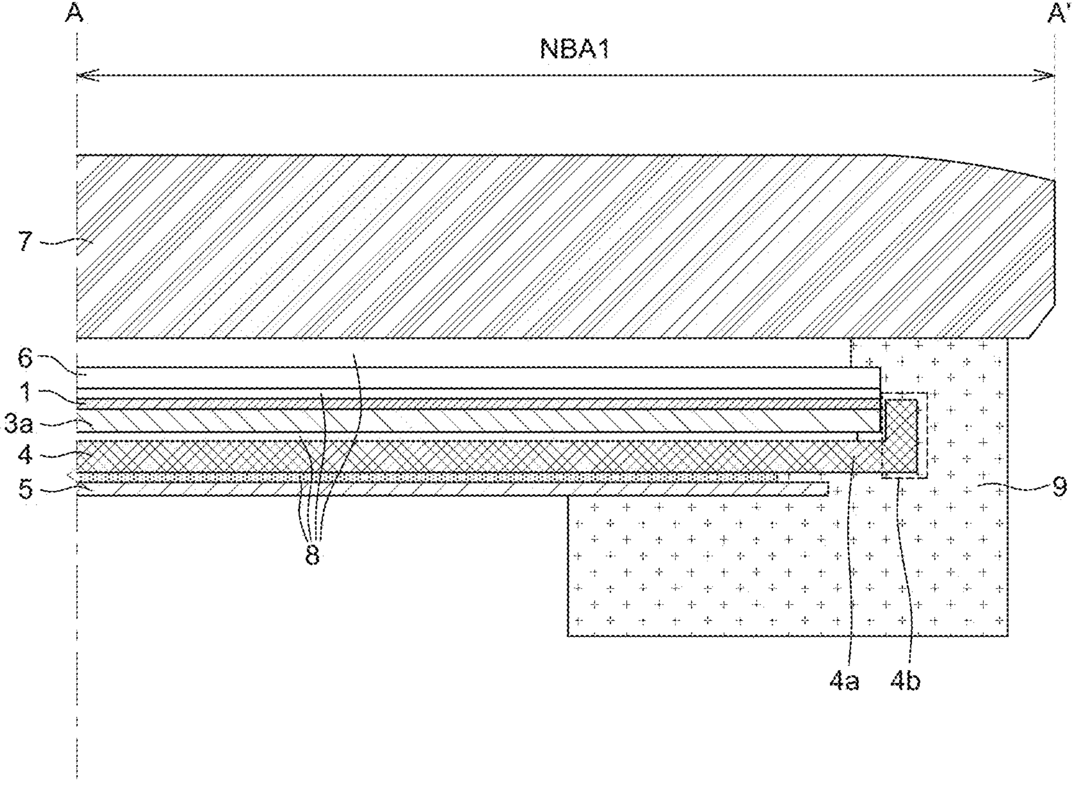
FIG. 3 is a cross-sectional view taken along line A-A' in FIG. 2 according to one or more embodiments of the present disclosure.

FIG. 3 is a cross-sectional view of the non-bending area according to one or more embodiments of the present disclosure. FIG. 3 is a cross-sectional view taken along line A-A' in FIG. 2.

With reference to FIG. 3, the display device may include the display panel 1 and the support member 4 according to one or more embodiments of the present disclosure.

The display panel 1 of the display device may display images or videos. The display panel according to one or more embodiments of the present disclosure may include a light-emitting diode display device.

The display panel 1 may include a flexible substrate. A display drive part may be disposed on the flexible substrate and include a plurality of thin-film transistors and light-emitting element layers. An encapsulation part and a touch part may be disposed on the display drive part.

The substrate may support various constituent elements of the display device. The substrate may be made of glass or a plastic material having flexibility.

For example, the substrate may be made of at least one of polyimide (PI), polymethylmethacrylate (PMMA), polyethylene terephthalate (PET), polyether sulfone, and polycarbonate (PC). However, the present disclosure is not limited thereto.

The plurality of thin-film transistors may be disposed on the substrate to operate the light-emitting element layers. For example, a first thin-film transistor and a second thin-film transistor may be disposed. The first thin-film transistor may be a switching thin-film transistor, and the second thin-film transistor may be a thin-film driving transistor. However, the embodiments of the present disclosure are not limited thereto.

The light-emitting element layer may be disposed on the thin-film transistor to display images. The light-emitting element layer may include a first electrode, an organic layer, and a second electrode.

When voltages are applied to the first electrode (or anode electrode) and the second electrode (or cathode electrode), positive holes move from the anode electrode to the light-emitting layer, and electrons move from the cathode electrode to the light-emitting layer. When positive holes and electrons are combined in the light-emitting layer, excitons are formed during an excitation process, and light is generated by energy from the excitons.

The organic layer may include at least one of a hole injecting layer (HIL), a hole transporting layer (HTL), an emitting layer (EML), an electron transporting layer (ETL), and an electron injecting layer (EIL).

The hole injecting layer (HIL) may serve to smoothly inject positive holes. For example, the hole injecting layer (HIL) may be made of any one or more of HATCN (1,4,5,8,9,11-hexaazatriphenylene-hexanitrile) and CuPc (copper phthalocyanine), PEDOT (poly(3,4)-ethylenedioxythiophene), PANI (polyaniline), and NPD (N,N-dinaphthyl-N,N'-diphenylbenzidine). However, the present disclosure is not limited thereto.

The hole transporting layer (HTL) may serve to smoothly transport positive holes. For example, the hole transporting layer (HTL) may be made of any one or more of NPD (N,N-dinaphthyl-N,N'-diphenylbenzidine), TPD (N,N'-bis-(3-methylphenyl)-N,N'-bis-(phenyl)-benzidine), s-TAD, and MTDATA (4,4',4"-Tris(N-3-methylphenyl-N-phenyl-amino)-triphenylamine). However, the present disclosure is not limited thereto.

The electron transporting layer (ETL) may serve to smoothly transport electrons. For example, the electron transporting layer (ETL) may be made of any one or more of $Alq_3$ (tris (8-hydroxyquinolino) aluminum), PBD (2-(4-biphenylyl)-5-(4-tert-butylpheny)-1,3,4 oxadiazole), TAZ, spiro-PBD, BAlq, and SAlq. However, the present disclosure is not limited thereto.

The electron injecting layer (EIL) may serve to smoothly inject electrons. For example, the electron injecting layer (EIL) may use $Alq_3$ (tris(8-hydroxyquinolino) aluminum), PBD (2-(4-biphenylyl)-5-(4-tert-butylpheny)-1,3,4 oxadiazole), TAZ, spiro-PBD, BAlq, or SAlq. However, the present disclosure is not limited thereto.

The emitting layer (EML) may be disposed in a bank hole and at least partially overlap a bank. The emitting layers (EML) may be formed to be spaced apart from each other between the adjacent subpixels. For example, the light-emitting layer may be deposited on each of the subpixels by means of a fine metal mask (FMM).

The light-emitting layer may include light-emitting materials that respectively emit red light, green light, and blue light. The light-emitting material may be made of a phosphorescent material or a fluorescent material.

The encapsulation part may be disposed on the light-emitting element layer. The encapsulation part may protect the organic layer of the light-emitting element layer from external moisture, oxygen, or foreign substances. For example, the encapsulation part may suppress the penetration of oxygen and moisture from the outside in order to suppress an oxidation of the light-emitting material and the electrode material.

The encapsulation part may include a first encapsulation layer, a second encapsulation layer, and a third encapsulation layer that blocks the penetration of moisture or oxygen. The first encapsulation layer, the second encapsulation layer, and the third encapsulation layer may be structured to be alternately stacked. However, the embodiments of the present disclosure are not limited thereto.

The encapsulation part may be made of a transparent material that transmits light emitted from the light-emitting layer.

The touch part may be disposed on the encapsulation part. The touch part may include a plurality of touch electrodes. For example, the touch part may include a first touch electrode and a second touch electrode. The first touch electrode may receive a touch detection signal from a touch drive part. The second touch electrode may transmit a touch driving signal to the touch drive part. The touch drive part may detect the user's touch by using mutual capacitance between the plurality of first touch electrodes and the plurality of second touch electrodes. For example, in case that a touch operation is performed on the display device 1000, the capacitance may change between the first touch electrode and the second touch electrode. The touch drive circuit may detect a touch coordinate by detecting the change in capacitance.

A polarizing plate 6 may be disposed on the display panel 1. The polarizing plate 6 may be disposed in the first non-bending area NBA1.

The polarizing plate 6 may selectively transmit light and reduce reflection of external light entering the display device 1000. For example, the display device 1000 include various metallic materials applied to the thin-film transistor, the light-emitting layer, lines, and the like. The external light entering the display device 1000 may be reflected by the metallic material, and the reflection of the external light may decrease the visibility of the display device 1000. Therefore, the polarizing plate 6 may be disposed on one surface of the display device 1000 to suppress the reflection of the external light, thereby improving outdoor visibility of the display device 1000.

The polarizing plate 6 may be excluded in accordance with the structure or the like of the display device 1000.

The polarizing plate 6 may be attached to the display panel 1 by using a bonding member 8.

The bonding member 8 may be made of a material having bondability, e.g., an optically clear adhesive (OCA), optically clear resin (OCR), a pressure sensitive adhesive (PSA), or the like. However, the present disclosure is not limited thereto.

A front surface member 7 may be disposed on the polarizing plate 6. The front surface member 7 may be disposed in the first non-bending area NBA1.

The front surface member 7 may protect the display panel 1, which is positioned below or above the front surface member 7, and other constituent elements from external impact, moisture, heat, or the like. The front surface member 7 may be made of a material having impact resistance and light transmissivity. For example, the front surface member 7 may be a substrate made of glass or a film made of a plastic material such as polymethylmethacrylate (PMMA), polyimide (PI), or polyethylene terephthalate (PET). However, the present disclosure is not limited thereto. In addition, the front surface member 7 may be referred to as various names such as a cover window, a window cover, or a cover glass. However, the embodiments of the present disclosure are not limited thereto.

The front surface member 7 may be formed to be transparent to transmit the light, which is emitted from the display panel 1, to the outside of the display device and allow the user to identify an image provided by the display device.

A blocking part may be disposed at an end of the front surface member 7. A blocking part may be disposed to surround a part of an end of the display panel 1. The blocking part may be formed to be opaque so that the lines, the drive circuit, and various constituent elements, which are formed below or above the front surface member 7 of the display device 1000, are not visually recognized by the user.

The blocking part may include a light-blocking material such as pigment, dye, and carbon black. However, the embodiments of the present disclosure are not limited thereto. For example, the blocking part may be formed by forming or applying black ink onto the front surface member 7. Alternatively, the blocking part may be formed as a separate component provided at an edge of a rear surface of the front surface member 7 and attached to the front surface member 7.

The blocking part may be disposed to partially overlap one or more of the display panel 1, a first plate 3*a*, the support member 4, and a heat dissipation member 5. In case that the display panel 1 is bent, the blocking part may be disposed to partially overlap one or more of a second plate 3*b* and the flexible film 2.

According to one or more embodiments of the present disclosure, the plate may include the first plate 3*a* and the second plate 3*b*. The first plate 3*a* may be disposed in the first non-bending area NBA1 and support the display panel 1, which has flexibility while corresponding to the display area AA of the display panel 1, such that the display panel 1 may be kept in a flat state.

The plate may be disposed on the rear surface of the display panel 1. For example, the first plate 3*a* may be disposed on the rear surface of the display panel 1. The first plate 3*a* may be disposed on the rear surface of the display panel 1 and support and/or protect the display panel 1. The plate may be made of a material having high thermal conductivity while having rigidity. For example, the plate may be made of a plastic material or a metallic material such as aluminum (Al), copper (Cu), zinc (Zn), silver (Ag), gold (Au), iron (Fe), stainless steel (SUS), or Invar. However, the embodiments of the present disclosure are not limited thereto.

The first plate 3*a* may be attached to the display panel 1 by using the bonding member 8.

The bonding member 8 may be made of a material having bondability, e.g., an optically clear adhesive (OCA), optically clear resin (OCR), a pressure sensitive adhesive (PSA), or the like. However, the present disclosure is not limited thereto.

The support member 4 may be disposed on a rear surface of the first plate 3*a* in the first non-bending area NBA1.

The support member 4 may support one of or both the rear surface and side surface of the display panel 1. The support member 4 may have a plate shape.

The support member 4 may have a quadrangular plate shape corresponding to a shape of the display device. An edge of the support member 4 may be bent toward the front surface and surround and accommodate the display panel 1 therein. For example, the support member 4 may support the display panel 1 and protect the side surface and the rear surface of the display device 1 from an external impact.

The support member 4 may include a body portion 4*a* and a protruding portion 4*b*.

The body portion 4*a* may be positioned on the rear surface of the display panel 1 and support the display panel 1. The body portion 4*a* may be formed in a flat state. The body portion 4*a* may overlap the display panel 1.

The protruding portion 4*b* may extend from the body portion 4*a*. The protruding portion 4*b* may be disposed in the first non-bending area NBA1 of the body portion 4*a*. The protruding portion 4*b* may protrude toward the front surface of the display panel 1. The protruding portion 4*b* may at least partially overlap the side surface of the display panel 1.

The protruding portion 4*b* may be configured to have a predetermined angle with respect to the body portion 4*a*. For example, an angle between the protruding portion 4*b* and the body portion 4*a* may be 90 degrees or a right angle. Because of the protruding portion 4*b*, the support member 4 may have a stepped portion or a curved portion. The protruding portion 4*b* may mitigate or reduce an external impact applied to a corner portion of the display device, which may reduce or suppress an external impact to be applied to the display panel 1.

With reference to FIG. 3, an end of the support member 4 may have an "L" shape. For example, the body portion 4*a* and the protruding portion 4*b* of the support member 4 may define an "L" shape toward the front surface of the display panel 1. The support member 4 may surround the rear surface and the side surface of the display panel 1 in the first non-bending area NBA1, thereby protecting the display panel 1 from an external impact.

The support member 4 may be made of a material having high rigidity and high thermal conductivity. For example, the support member 4 may be made of a plastic material or a metallic material such as aluminum (Al), copper (Cu), zinc (Zn), silver (Ag), gold (Au), iron (Fe), stainless steel (SUS), or Invar. However, the embodiments of the present disclosure are not limited thereto.

Because the end of the support member 4 is bent and protects the display panel 1, it is possible to minimize or at least reduce damage to the display device 1000 caused by an external impact.

The support member 4 may be attached to the first plate 3*a* by using the bonding member 8.

The bonding member 8 may be made of a material having bondability, e.g., an optically clear adhesive (OCA), optically clear resin (OCR), a pressure sensitive adhesive (PSA), or the like. However, the present disclosure is not limited thereto.

The heat dissipation member 5 may be disposed on a rear surface of the support member 4.

The heat dissipation member 5 may dissipate heat transferred from the display panel 1. The heat dissipation member 5 may include a material excellent in thermal conduction, and the heat dissipation member 5 may disperse heat transferred from the display panel 1. For example, the heat dissipation member 5 may be made of a metallic or plastic material, such as aluminum (Al), copper (Cu), zinc (Zn), silver (Ag), gold (Au), iron (Fe), stainless steel (SUS), Invar, or graphite and at least include one or more materials, an alloy material thereof, or a joint structure. However, the embodiments of the present disclosure are not limited thereto.

In the first non-bending area NBA1, cut surfaces of the display panel 1, the first plate 3*a*, and the polarizing plate 6 may each be formed straight without a stepped portion, an inclination, or a curved portion. For example, the display panel 1, the first plate 3*a*, and the polarizing plate 6 may have the same surface in a direction perpendicular to the display panel 1.

A frame may be disposed on a rear surface of the heat dissipation member 5. The frame may be a constituent element configured to protect the display panel 1 from an external impact and allow the display panel 1 and the constituent elements of the display panel 1 to be mounted thereon. The frame may be disposed below the heat dissipation member 5.

According to one or more embodiment of the present disclosure, a first protection member 9 may be disposed in the first non-bending area NBA1. For example, the first protection member 9 may be disposed on an outer peripheral portion of the display device 1000.

The first protection member 9 may be disposed along an outer peripheral portion of the display device 1000.

The first protection member 9 may be formed to reinforce the side surface of the display panel 1 after the process of bending the display panel 1. After a frame 11 is disposed, the first protection member 9 may be disposed to cover the side surface of the display device 1000. The first protection member 9 may further cover a bottom surface (or lower portion) of the outer peripheral portion of the display device 1000.

The first protection member 9 may include resin. However, the present disclosure is not limited thereto. The first protection member 9 may include a material that transmits ultraviolet rays. The first protection member 9 may be formed by curing a material of the first protection member by irradiating the material of the first protection member with light. For example, the first protection member 9 may be formed by curing a material of the first protection member by using ultraviolet rays.

A tensile modulus of the first protection member 9 may be different from a tensile modulus of a second protection member 10 to be described below with reference to FIG. 5. For example, the tensile modulus of the first protection member 9 may be equal to or higher than a tensile modulus of the second protection member 10.

Because the display device 1000 is vulnerable to an external impact, the lines of the display device 1000 may be disconnected by an external impact, which may cause a problem in that the display device 1000 does not operate. The second protection member 10 may be disposed because the bending area is vulnerable to an external impact. Further, the first protection member 9 may be disposed to more effectively mitigate an impact applied to the bending area of the display device 1000 and an impact applied to the outer peripheral portion of the display device 1000 on which the second protection member 10 is not disposed.

The first protection member 9 having a high tensile modulus may protect the outer peripheral portion of the display device 1000 and suppress the disconnection of the lines caused by an impact from the outside. In addition, it is possible to inhibit the display panel 1 from being damaged or broken, for example, to inhibit the display panel 1 from being crushed or deformed.

Figure 4:
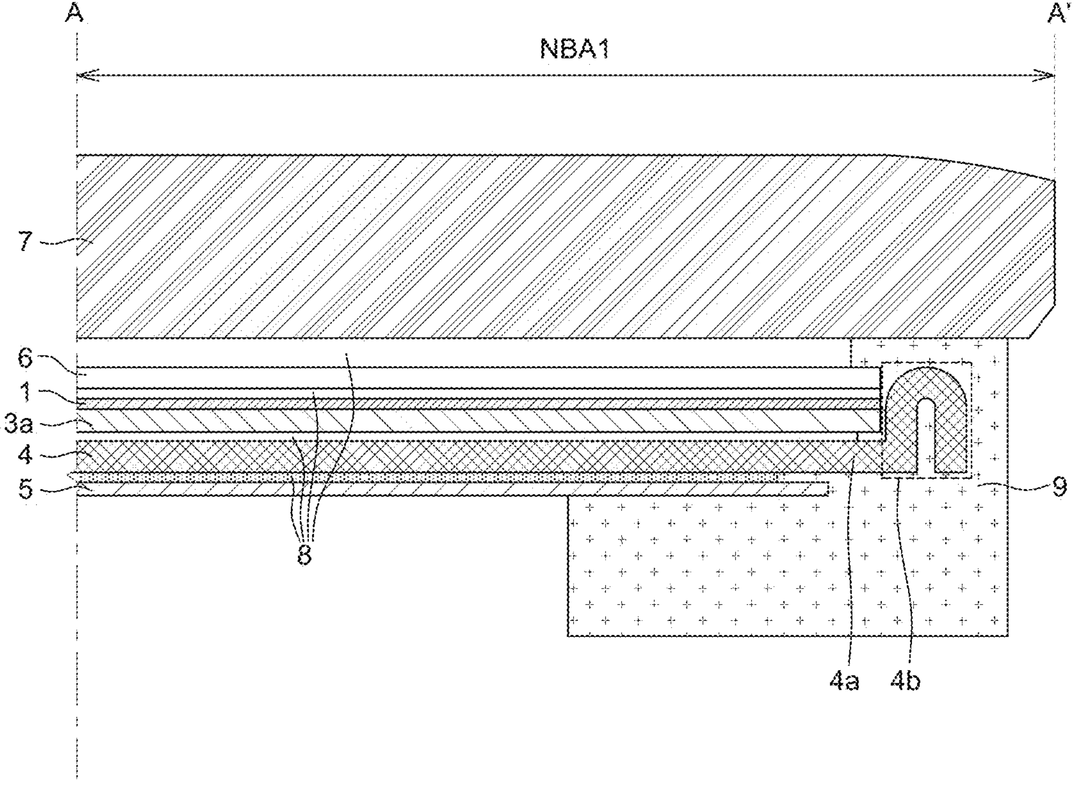
FIG. 4 is a cross-sectional view of a non-bending area according to one or more embodiments of the present disclosure.

FIG. 4 is a cross-sectional view of a non-bending area according to one or more embodiments of the present disclosure.

With reference to FIG. 4, the display device 1000 may include the display panel 1 and the support member 4 according to one or more embodiments of the present disclosure. The components illustrated in FIG. 4 are substantially identical to the components illustrated in FIG. 3, except for a configuration of a support member. Therefore, a repeated description will be omitted.

The support member 4 may include the body portion 4*a* and the protruding portion 4*b*.

The protruding portion 4*b* according to one or more embodiments of the present disclosure may extend from the body portion 4*a* and be disposed in the first non-bending area NBA1 of the body portion 4*a*. The protruding portion 4*b* may protrude from the front surface of the display panel 1. The protruding portion 4*b* may at least partially overlap the side surface of the display panel 1.

The protruding portion 4*b* may be configured to have a predetermined angle with respect to the body portion 4*a*. For example, an angle between the protruding portion 4*b* and the body portion 4*a* may be 90 degrees or a right angle. Because of the protruding portion, the support member 4 may have a stepped portion or a curved portion.

With reference to FIG. 4, an end of the support member 4 may have a round shape. For example, the body portion 4*a* and the protruding portion 4*b* of the support member 4 may have a "∩" shape toward the front surface of the display panel 1. The support member 4 may surround the rear surface and the side surface of the display panel 1 in the first non-bending area NBA1, thereby protecting the display panel 1 from an external impact. The protruding portion 4*b* may mitigate or reduce an external impact applied to a corner portion of the display device, which may reduce or suppress an external impact to be applied to the display panel 1.

According to one or more embodiments of the present disclosure, the plurality of members capable of mitigating an impact is disposed between the end of the display device 1 and the display panel 1, which may further minimize or at least reduce damage to the display device 1 caused by an external impact.

The shape of the protruding portion 4*b* is not limited to an "L" shape and a "∩" shape. For example, in various embodiments, the protruding portion 4*b* may have various shapes such as a "W" shape or an "M" shape.

Figure 5:
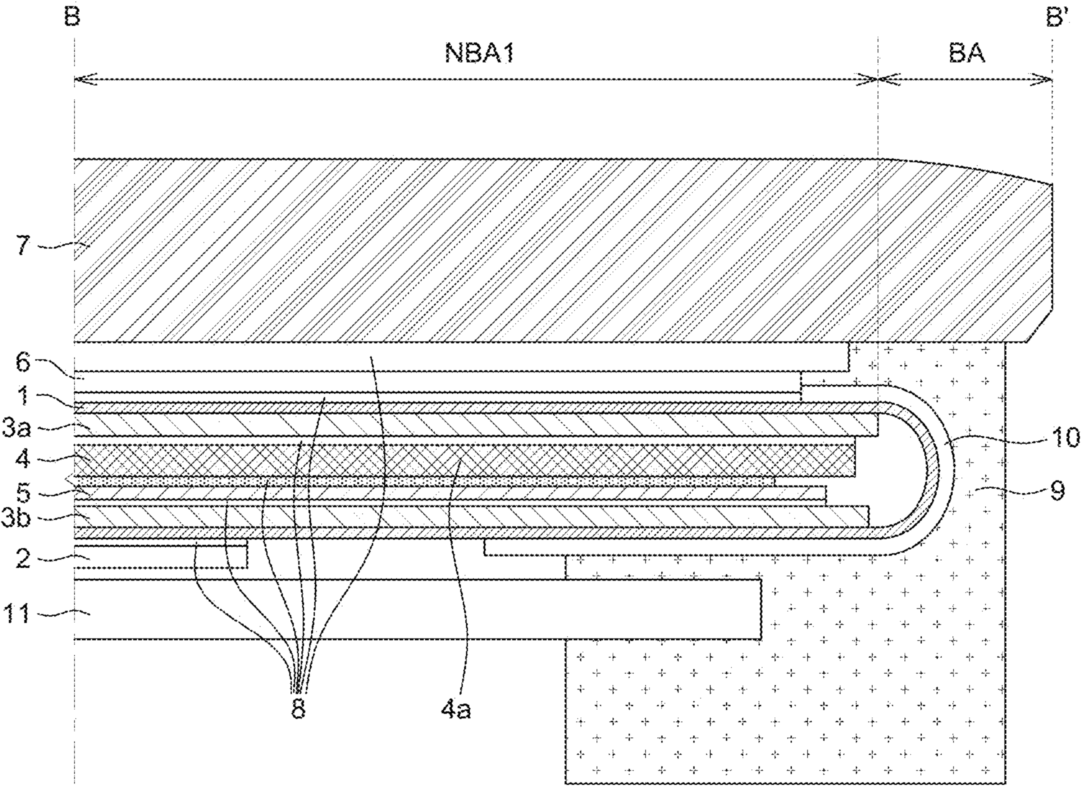
FIG. 5 is a cross-sectional view of a bending area taken along line B-B' in FIG. 2 according to one or more embodiments of the present disclosure.

FIG. 5 is a cross-sectional view of the bending area taken along line B-B' in FIG. 2 according to one or more embodiments of the present disclosure.

With reference to FIG. 5, the display device 1000 may include the display panel 1, the flexible film 2, and the second protection member 10 according to one or more embodiments of the present disclosure. The components illustrated in FIG. 5, which are identical to the components described with reference to FIG. 3, will be assigned to the same reference numerals, and a repeated description will be omitted.

A portion of the support member 4, which corresponds to the bending area BA, may include the body portion 4*a*. The portion of the support member 4, which corresponds to the bending area BA, may include no protruding portion. For example, the first plate 3*a* or the second plate 3*b* may further protrude than the support member 4.

The support member 4 may have a quadrangular plate shape corresponding to the shape of the display device 1000. An edge of the support member 4 may be bent toward the front surface and surround and accommodate the display panel 1 therein. For example, the support member 4 may support the display panel 1 and protect the side surface and the rear surface of the display device 1000 from an external impact.

Therefore, a portion of the support member 4, which corresponds to the first non-bending area NBA1, and a portion of the support member 4, which corresponds to the bending area BA, may have different shapes.

With reference to FIG. 5, the second plate 3*b* may be disposed on the rear surface of the heat dissipation member 5.

Before the display panel 1 is bent, the second plate 3*b* may be disposed in the second non-bending area NBA2 and support the display panel 1 and the flexible film 2 having flexibility.

After the display panel 1 is bent, the second plate 3*b* may be attached to the heat dissipation member 5 by using the bonding member 8.

The flexible film 2 may be disposed on a rear surface of the second plate 3*b*.

The flexible film 2 may electrically connect the display panel 1 and a printed circuit board that generates and outputs a pixel driving signal to the display panel 1.

As another example, the flexible film 2 may transmit a signal, which is outputted from the printed circuit board, to the display panel 1 and/or the printed circuit board.

The flexible film 2 may be made of a material having flexibility. For example, the flexible film 2 may be made of a plastic material such as polyimide (PI). However, the embodiments of the present disclosure are not limited thereto.

With reference to the bending area BA in FIG. 5, the display panel 1 may be bent by the bending process and positioned on the rear surface of the second plate 3*b*. For example, the second protection member 10 may be formed on the display panel 1 in the bending area BA before the bending process, and the second protection member 10, together with the display panel 1, may be bent during the bending process and disposed along the bending area.

The second protection member 10 may suppress the occurrence of cracks and the penetration of external moisture and/or oxygen during the process of bending the display panel 1. Alternatively, the second protection member 10 may suppress the disconnection of the lines caused by an external impact applied to the bending area BA after the bending process or suppress the penetration of external moisture and/or oxygen into the display panel 1.

The second protection member 10 may be disposed to cover at least a part of the display panel 1 disposed in the bending area BA.

The second protection member 10 may include resin and use ultraviolet (UV) curable acrylic-based resin or epoxy resin. However, the present disclosure is not limited thereto.

The second protection member 10 may be formed as a product made by applying resin and then curing the resin. In case that ultraviolet curable resin is used as the resin, the resin may be cured by ultraviolet (UV) rays.

The first protection member 9 may be disposed on the second protection member 10. The second protection member 10 may be disposed between the display panel 1 and the first protection member 9.

The frame 11 may be disposed on the rear surface of the second plate 3*b* or the display panel 1.

The frame 11 may be a constituent element configured to protect the display panel 1 from an external impact and allow the display panel 1 and the constituent elements of the display panel 1 to be mounted thereon. The frame 11 may be disposed below the heat dissipation member 5.

The foregoing embodiments are briefly described below.

The display device according to one or more embodiments of the present disclosure comprises a display panel comprising a plurality of non-bending areas, and a bending area disposed between the plurality of non-bending areas; and a support member disposed on a rear surface of the display panel, wherein an end of the support member in the bending area and an end of the support member in the non-bending area have different shapes.

In the display device according to one or more embodiments of the present disclosure, the plurality of non-bending areas comprises a first non-bending area and a second non-bending area.

In the display device according to one or more embodiments of the present disclosure, a plurality of subpixels SP are disposed in the first non-bending area.

In the display device according to one or more embodiments of the present disclosure, a portion of the support member, which corresponds to the first non-bending area, may overlap a part of a side surface of the display panel. In the display device according to one or more embodiments of the present disclosure, the portion of the support member, which corresponds to the first non-bending area, may have an "L" shape.

In the display device according to one or more embodiments of the present disclosure, the portion of the support member, which corresponds to the first non-bending area, may have a "∩" shape.

In the display device according to one or more embodiments of the present disclosure, the support member may comprise a body portion corresponding to the display panel, and a protruding portion protruding from the body portion to the display panel.

In the display device according to one or more embodiments of the present disclosure, the body portion and the protruding portion may accommodate the display panel.

The display device according to one or more embodiments of the present disclosure, may further comprise a first protection member disposed on the display panel, wherein the first protection member may cover the support member.

In the display device according to one or more embodiments of the present disclosure, one side of the first protection member may be in contact with at least a part of the display panel.

In the display device according to one or more embodiments of the present disclosure, the first protection member may include an ultraviolet transmissive material.

The display device according to one or more embodiments of the present disclosure, may further comprise a second protection member disposed between the display panel and the first protection member in the bending area.

In the display device according to one or more embodiments of the present disclosure, the first protection member and the second protection member may include resin.

The display device according to one or more embodiments of the present disclosure, may further comprise a polarizing plate disposed on the display panel, wherein the support member overlaps one side of the polarizing plate.

Display devices according to embodiments of the present disclosure include mobile devices, video phones, smart watches, watch phones, wearable device (apparatus), foldable device (apparatus), rollable device (apparatus), bendable device (apparatus), flexible device (apparatus), curved device (apparatus), sliding device (apparatus), variable device (apparatus), electronic notebook, e-book, portable multimedia player (PMP), personal digital assistant (PDA), MP3 player, mobile medical device, desktop PC, laptop PC, netbook computer, workstation, navigation, in-vehicle navigation, in-vehicle display device, in-vehicle device, theater device, theater display device, television, wallpaper device, signage device, gaming device, laptop, monitor, camera, camcorder, and home appliance. Further, a display device according to one or more embodiments of the present disclosure can be applied to an organic light emitting illumination device or an inorganic light emitting illumination device.

Although the embodiments of the present disclosure have been described in detail with reference to the accompanying drawings, the present disclosure is not limited thereto and may be embodied in many different forms without departing from the technical concept of the present disclosure. Therefore, the embodiments of the present disclosure are provided for illustrative purposes only but not intended to limit the technical concept of the present disclosure. The scope of the technical concept of the present disclosure is not limited thereto. Therefore, it should be understood that the above-described embodiments are illustrative in all aspects and do not limit the present disclosure.

What is claimed is:

1. A display device comprising:

a display panel comprising a plurality of non-bending areas, and a bending area between the plurality of non-bending areas; and a support member on a rear surface of the display panel, wherein the display panel includes an active area in a first non-bending area of the plurality of non-bending areas, wherein the bending area continuously extends from the first non-bending area and is bent with a curvature, wherein a second non-bending area of the plurality of non-bending areas continuously extends from the bending area such that a rear surface of the second non-bending area faces a rear surface of the first non-bending area, and wherein a first end of the support member overlapping the bending area and a second end of the support member overlapping the first non-bending area have different shapes.

2. The display device of claim 1, wherein a plurality of subpixels are in the first non-bending area.

3. The display device of claim 2, wherein a portion of the support member that corresponds to the first non-bending area overlaps a part of a side surface of the display panel.

4. The display device of claim 3, wherein the portion of the support member that corresponds to the first non-bending area has an "L" shape.

5. The display device of claim 3, wherein the portion of the support member that corresponds to the first non-bending area has a "∩" shape.

6. The display device of claim 1, wherein the support member comprises:

a body portion that corresponds to the display panel; and a protruding portion that protrudes from the body portion to the display panel.

7. The display device of claim 6, wherein the body portion and the protruding portion accommodate the display panel.

8. The display device of claim 1, further comprising:

a first protection member on the display panel, wherein the first protection member covers the support member.

9. The display device of claim 8, wherein a side of the first protection member is in contact with at least a part of the display panel.

10. The display device of claim 8, wherein the first protection member includes an ultraviolet transmissive material.

11. The display device of claim 8, further comprising:

a second protection member between the display panel and the first protection member in the bending area.

12. The display device of claim 11, wherein the first protection member and the second protection member include a resin.

13. The display device of claim 1, further comprising:

a polarizing plate on the display panel, wherein the support member overlaps a side of the polarizing plate.

14. The display device of claim 13, wherein the polarizing plate is in the first non-bending area.

15. The display device of claim 1, wherein the display panel comprises a substrate that includes a material having flexibility.

* * * * *